E. STONE.
Car-Couplings.
No. 156,508.  Patented Nov. 3, 1874.
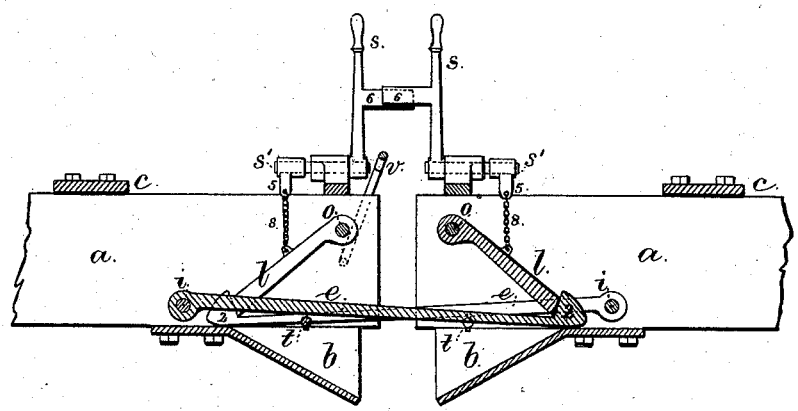
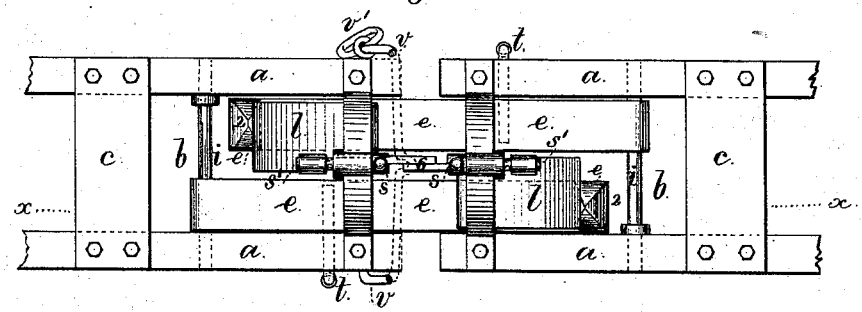
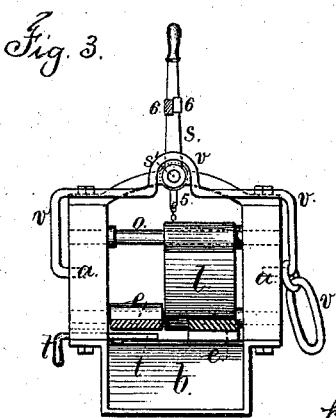
Witnesses,
Chas H. Smith
Geo. D. Pinckney
Inventor
Eaton Stone
per Lemuel W. Serrell
atty

UNITED STATES PATENT OFFICE.

EATON STONE, OF FRANKLIN, NEW JERSEY.

IMPROVEMENT IN CAR-COUPLINGS.

Specification forming part of Letters Patent No. 156,508, dated November 3, 1874; application filed March 24, 1874.

*To all whom it may concern:*

Be it known that I, EATON STONE, of Franklin, in the county of Essex and State of New Jersey, have invented an Improvement in Car-Couplings, of which the following is a specification:

This coupling is made for insuring a very reliable connection under ordinary circumstances, but for allowing the cars to disconnect in cases where one may jump from the track, and fall over partially or entirely.

I make use of hinged coupling-bars with end projections, against which a hinged pawl-plate is allowed to drop. These parts are upon each end of each car, and at one side of the center line, so as to pass by each other, and couple doubly and in opposite directions. A lever and crank are employed to raise the hinged pawl-plates in uncoupling the cars, and the levers are made so that the lever on one car will operate the uncoupling-lever on the other car.

In the drawing, Figure 1 is a plan of the two contiguous car-couplings. Fig. 2 is a vertical section of the same at the line $x\ x$, and Fig. 3 is an end view of the coupling.

The bars $a\ a$ are of suitable size, and form part of the draft-head. The shoe $b$ connects them together at the bottom of the outer end, and the bars or frames $c$ hold them together at their upper edges.

The coupling-bars $e$ are hinged by the bolts $i$ to the respective draft-head bars $a$, and the bar $e$ of each draft-head is at one side, so that the two bars slip past each other as the two parts of the coupling come together, the moving end of each bar sliding up the opposite shoe $b$.

At the end of each bar $e$ there is a projection, 2, that is, by preference, made somewhat conical, and above the bar in each draft-head there is a pawl-plate, $l$, swinging upon a horizontal hinge-pin, $o$, and catching behind the projection 2, so as firmly to couple the cars together; but if one car jumps the track and falls over sufficiently to turn the bar $e$ up edgewise to the pawl-plate, the parts will become disconnected.

In order to lift the pawl-plates $l$, and disconnect the parts, I employ the levers $s$, having shafts $s'$, and crank-arms 5, connected by chains 8 to the respective pawls $l$, so that such pawls can be raised to uncouple the cars when such levers $s$ are moved. When the levers $s$ are made with arms or plates 6, of sufficient length to reach the similar lever or plate on the other part of the coupling of the next car, then the two pawl-plates can be simultaneously raised by operating the levers together, one lever moving the other.

The positions of the crank-arms 5 to the levers $s$ may be such that they will lie down out of the way, and level or nearly so with the platform.

As the cars are pressed together, the pawl-plates are raised by the ends of the bars $e$, as they run in below said pawl-plates.

The key $t$, inserted between the bar $e$ and shoe $b$, serves to prevent said bar $e$ falling too low, and this may have a feather to prevent it working out, the hole in the bar $a$ through which it passes being slotted to pass that feather.

The swinging yoke $v$, that extends from one side of one bar $a$ to the other side of the other bar, and upon which is the coupling-link $v'$, serves to connect this improved coupling with the ordinary draft-head, in which case the key or pin $t$ should be withdrawn to allow the coupling-bar $e$ to drop down out of the way.

I do not claim two coupling-bars, one in each head, and passing side by side into the opposite heads and pawls to engage with the ends of the coupling-bars, as these have been used.

I claim as my invention—

1. The draw-head bars $a\ a$, receiving between them the coupling-bar $e$, with the head 2 at one end, and hinged to the bars $a$ at the other, the pawl $l$, upon the bolt $o$, inclined backwardly, and occupying the space between the bars $a$, to one side of the coupling-bar $e$, so as to receive the moving end of the next coupling-bar, all combined as set forth.

2. The levers $s$, with the projecting arms 6, and cranks 5, in combination with the coupling-bars $e$, and pawl-plates $l$, substantially as set forth.

Signed by me this 18th day of March, A. D. 1874.

EATON STONE.

Witnesses:
 GEO. T. PINCKNEY,
 CHAS. H. SMITH.